Figure 2A:
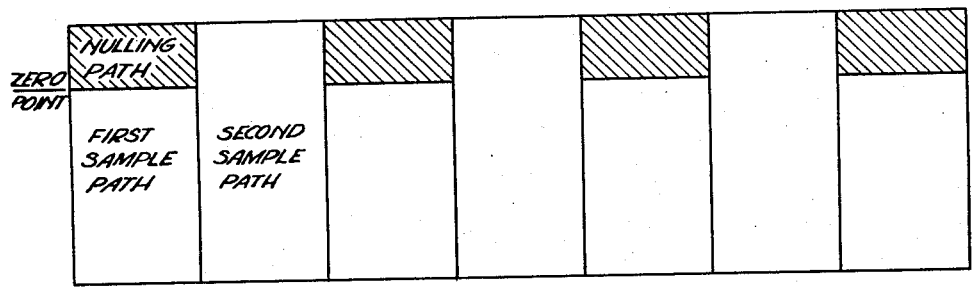

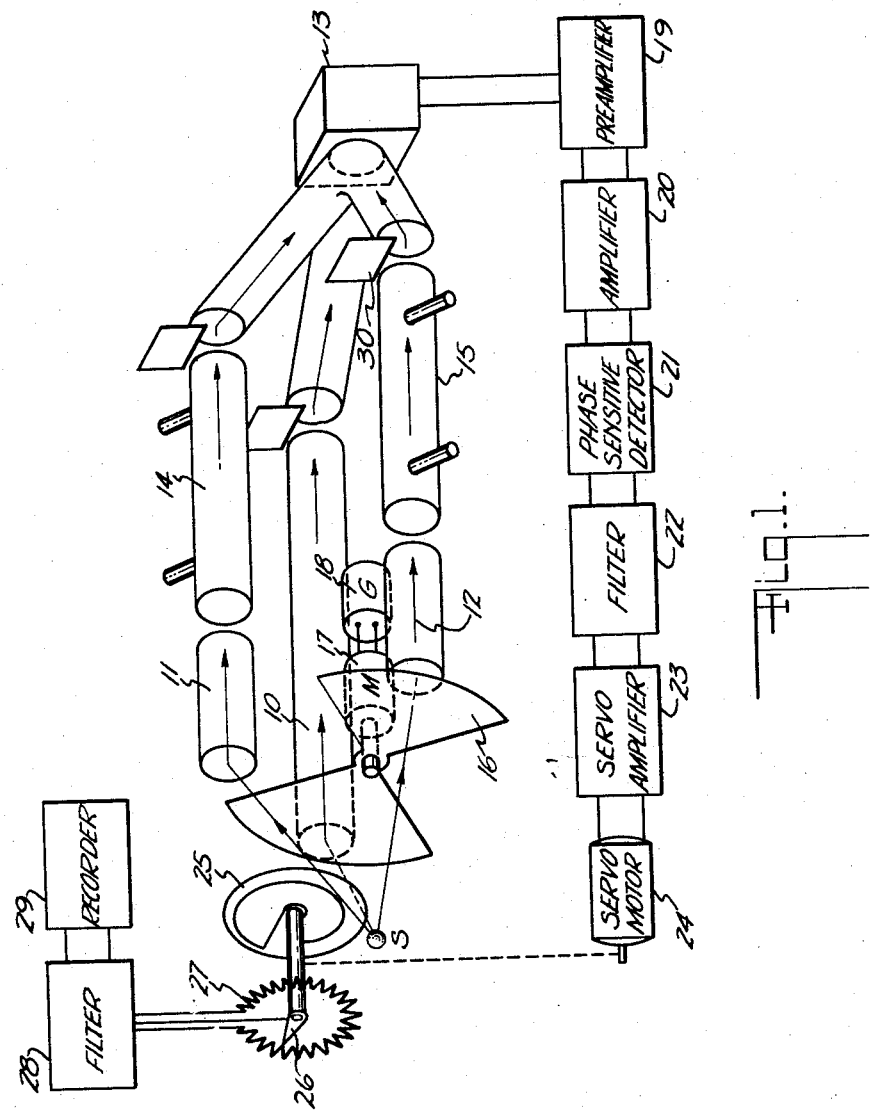

Sept. 15, 1959     H. SOBCOV ET AL     2,904,687
DIFFERENTIAL RADIATION ABSORPTION MEASUREMENT SYSTEM
Filed Nov. 28, 1955     3 Sheets-Sheet 3

INVENTORS.
JOSEPH L. BORDEN
HAROLD SOBCOV
BY
ATTORNEY

United States Patent Office 2,904,687
Patented Sept. 15, 1959

2,904,687

DIFFERENTIAL RADIATION ABSORPTION MEASUREMENT SYSTEM

Harold Sobcov, Sierra Madre, Calif., and Joseph L. Borden, Westport, Conn., assignors to The Perkin-Elmer Corporation, Norwalk, Conn., a corporation of New York Application November 28, 1955, Serial No. 549,241

8 Claims. (Cl. 250—43.5)

The present invention is directed to a system for measuring radiation absorption and more specifically is concerned with the precise measurement of the relative content of a particular radiation absorptive component in each of two samples so as to provide an accurate indication of the difference in the concentration of that absorptive component as between the two samples.

The samples may comprise a mixture of numerous fluid components such as gas mixtures or liquid mixtures. Such samples may be discrete volumes of fluid extracted from a "batch" for test purposes or may be "on stream" samples secured from a continuous flow by means of tapping into a process stream. The present invention may also be employed to establish a desired standard of concentration of the radiation absorptive component of interest by preparing a sample mixture having the desired concentration of the component of interest. The sample mixture thus prepared may be used as a reference, and the detected differential between the reference sample and discrete "batch" samples or "on stream" samples may be employed as a measure of the appropriate correction and adjustment which is necessary to produce the desired concentration of the radiation absorptive component of interest.

Known systems for achieving such differential measurement usually consist of two separate instruments, each of which measures the content of a particular radiation absorptive component. In accordance with customary practice, a comparison means may be included in a recorder or similar device which is adapted to receive the output of the two instruments and produce a recorded signal as a function of the difference therebetween.

It is readily apparent that the use of two instruments is a basic complication of the problem of achieving extreme accuracy of differential measurement inasmuch as the sources of inaccuracy in such an arrangement are compounded by being substantially doubled. That is to say that, in the use of two instruments to provide outputs which are compared to give a differential measurement between the respective concentrations of a particular radiation absorptive component in each of two samples, there may be error due to variation, for instance, in either one or both of the two radiation sources used in the instruments, variation or disparity in ambient conditions, variation in either one or both of the radiation detectors used in the two instruments, or operative instability in either one or both of the instruments due to numerous causes, such as changes in values of electrical components, drift, power source fluctuations, etc.

The present invention employs a single radiation source and a single radiation detector and obviates many of the most serious sources of such error by incorporating in a single instrument a system utilizing three radiation paths, two of which contain the respective samples being investigated, and a third path which is used to measure the difference in concentration of a particular radiation absorptive component common to the two samples. The radiation absorptive component of interest may be a single fluid, fluids having common absorption characteristics, or a fluid mixture common to both samples being analyzed.

The object of the present invention therefore is to measure the relative concentration of a radiation absorption component in each of two samples with improved accuracy and precision.

In accordance with the concept and teaching of the present invention, each of the samples under investigation is introduced into a separate radiation path and the radiation in one of the sample paths is deliberately diminished so as to establish an initial state of unbalance between the energy transmitted by the two sample paths.

The slopes of the absorption-concentration characteristics of the sample paths are then equalized so that notwithstanding the initial state of unbalance which has been purposely introduced into the system, each of the sample paths will absorb the same amount of energy for a like change in percentage of concentration of the radiation absorptive component of interest. This condition may be made to hold true throughout a range which adequately covers the maximum differential anticipated between the two samples. The equalization of the slopes of the absorption characteristics of the two sample paths is accomplished in order that variation in concentration in one of the paths will effect an absorption of radiation energy by the same number of absolute units as would a consistent change in the concentration of the other path, rather than a percentagewise change, as would otherwise usually be the case.

Figure 3:
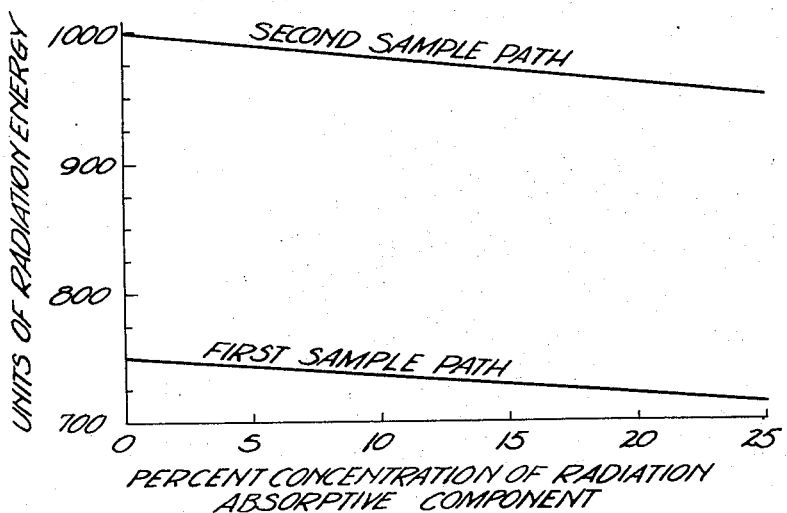
Figure 4:
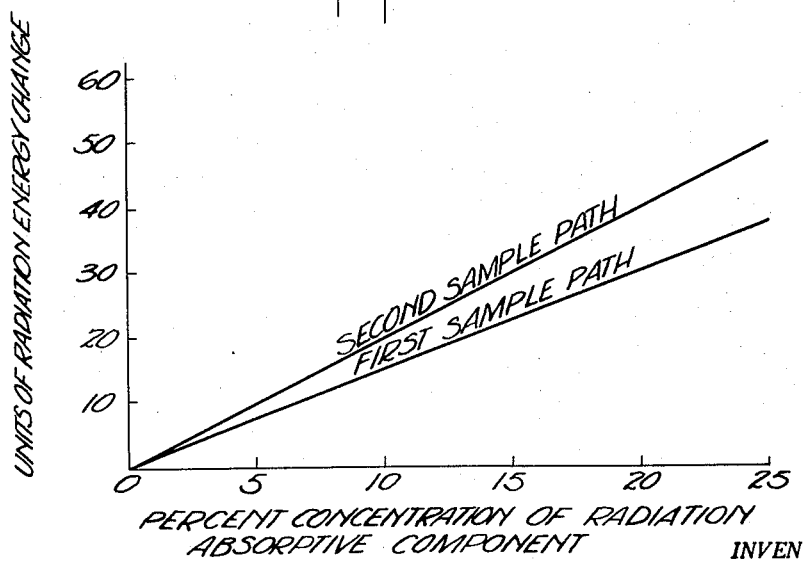

The equalization of the two sample paths may be accomplished in a number of different ways as will appear from a full understanding of the present invention. The choice of the specific manner in which such equalization is achieved may be determined in large part by the particular problem to which the apparatus of the present invention is applied and also whether the samples undergoing investigation are gas or liquid. The reasons for this particular adjustment will be understood more readily from the detailed description of an embodiment of the present invention, its operation, and the accompanying illustrative drawings in which, Fig. 1 is a schematic representation of a preferred embodiment of the present invention, Figs. 2a, b, and e are graphical illustrations of typical variations of radiant energy of the three beams of the present invention, Figs. 3 and 4 are graphical illustrations of the absorption v. concentration characteristics typical of the two sample paths of the present invention.

As shown in the schematic diagram of Fig. 1, the present invention may comprise the major radiation components of a source S, three radiation paths 10, 11 and 12, and a detector 13 which is responsive to the radiation impinging thereon and adapted to produce a signal as a function of the instantaneous intensity of such radiation. Two of the paths, 11 and 12, have sample cells 14 and 15 positioned to intercept radiation passing therethrough. The third path 10 is employed for nulling purposes. A chopper 16 is interposed in the three radiation paths 10, 11 and 12 so that it periodically and intermittently interrupts the passage of the radiation along the three paths. The chopper 16 is positioned and designed to effect interruption of one of the sample paths in unison with interruption of the third path and out of phase with the interruption of the other sample path. Thus, sample path 12 and the third or nulling path 10 are interrupted simultaneously while the other sample path 11 is interrupted in alternation therewith. The chopper 16 is driven by an appropriate means such as an electric motor 17. The electric motor 17 is also mechanically connected to drive a generator 18 which produces a signal in synchronism with the radiation chopping action previously described.

The detector 13 responds to the radiation it receives and produces an electrical signal correlated to the radiation intermittently transmitted through each of the three paths 10, 11 and 12. The detected radiation signals have an amplitude indicative of the difference in concentration of the radiation absorptive component as between the two samples in sample cells 14 and 15 and a phase which is indicative of which of the two concentrations in the samples is the greater. The detected radiation signals are amplified in a preamplifier 19 and an amplifier 20. The amplified radiation signals are fed to a phase-sensitive demodulator 21 which is arranged to also receive the synchronous signal output of the generator 18. The output of the phase-sensitive demodulator 21 is connected to a filter 22 which allows only the radiation differential signals to pass and such signals comprise the input to a servoamplifier 23. The servoamplifier output actuates a servomechanism motor 24 which is mechanically linked to a variable attenuator 25 interposed in the nulling path 10.

The servomechanism loop thus completed through the instrument is so designed, arranged, and adjusted that the position of the attenuator 25 will be changed in the correct amount and direction to vary the radiant energy passing through the nulling path 10, maintaining a null between the stronger radiation of one sample path and the sum of the weaker radiation of the other sample path added to that of the nulling path. It will be recalled that two of the paths are interrupted simultaneously and out of phase with the other path. The nulling path energy is therefore indicative of the difference in concentration of the radiation absorptive component in each of the two samples in the respective sample paths.

The attenuator 25 may be mechanically, pneumatically, or electrically linked to a recorder or other mechanism to make a permanent record of the information produced by the system. In this particular embodiment, the position of the attenuator 25 is correlated to the wiper 26 of a potentiometer 27 so that a signal is picked off which is commensurate with the adjustment of the attenuator 25 in the nulling path. The tapped signal is fed to a low-pass filter 28 which integrates noise of random nature. The filtered signal is employed to actuate a recorder 29. In an alternative arrangement the system output of the present invention may be used to control a process stream, for instance, so as to continuously maintain the differential of a particular component of the two samples within certain tolerable limits, or to equalize the concentrations of the component of interest.

The reasons and necessity for the particular mode of operation of the present invention may not be readily apparent from the foregoing description of the apparatus and its typical mode of operation. For instance, the manner in which the intensity of radiation in one of the sample paths is initially diminished in order to effect a basic state of unbalance is a feature of the present invention which adds greatly to its usefulness and broadens the significance of the information contained in its output signal. The advantages afforded by effecting such an initial state of unbalance between the radiation transmitted through the sample paths may be better appreciated by an explanation of the lack of flexibility which would result in a system similar to that contemplated by the present invention, but which does not incorporate the initial state of unbalance between the radiation passing through the two sample paths.

It will be apparent that in accordance with the teaching of the present invention, the radiation transmitted by one of the sample paths and the nulling path is simultaneously interrupted while the radiation from the other sample path is allowed to pass; conversely, the radiation transmitted by the second sample path is interrupted while the radiation in the first sample path and the nulling path are allowed to pass. Since the system is one which operates on the nulling principle, the sum of the radiation transmitted by the first sample path together with that transmitted by the nulling path is always maintained equal to that transmitted by the second sample path. If it is assumed that the initial intensity of the radiation in the two sample paths is the same, and the concentration of the radiation absorptive component is greater in the first sample path than in the second sample path, the nulling path will supply the additional radiant energy necessary to make up the difference and equalize the two so that a null is achieved.

Under the same assumption of equal initial radiation intensity in the sample paths, if the concentration of the radiation absorptive content in the second sample path is equal to the radiation absorptive component concentration in the first path, no nulling radiation energy will be required since the sample paths will of themselves be in a state of balance. If, in the course of variation, it happens that the concentration of radiation absorptive component of interest is greater in the second sample path than in the first sample path, the nulling path will be unable to effect a state of balance because the nulling path is only capable of adding to the radiation amplitude of the first sample path and cannot diminish or subtract radiation.

The present invention teaches the establishment of an initial state of unbalance which is substantially of the order of the maximum unbalance in concentration of the radiation absorptive component which may be anticipated between the two samples introduced into the apparatus. As illustrated in Fig. 1, such initial unbalance between the sample paths 11 and 12 may be readily effected to a known or determinable degree by the interposition of an adjustable trimmer such as that shown in 30 in sample path 12. The system when thus adjusted with an initial state of unbalance between the sample paths 11 and 12, without the introduction of any samples into the sample cells 14 and 15, requires that an amount of radiation energy pass through the nulling path 10 in order to effect a state of null. Figs. 2a, b, and c illustrate radiation intensity vs. time as received by the radiation detector 13 of the present invention. The initial state of null with no absorptive component in either of the sample paths is illustrated in Fig. 2a. A comparable state of balance producing zero signal indication obtains when the same amount of the absorptive component of interest is present in each of the sample paths. The initial state of null is, of course, the zero point to which all output signals of the system are referenced. This type of zero point in measuring instrumentation is usually called a "live zero."

Figure 2B:
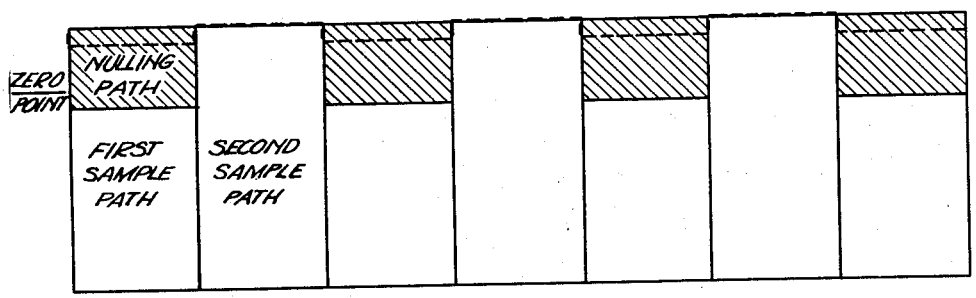
Figure 2C:
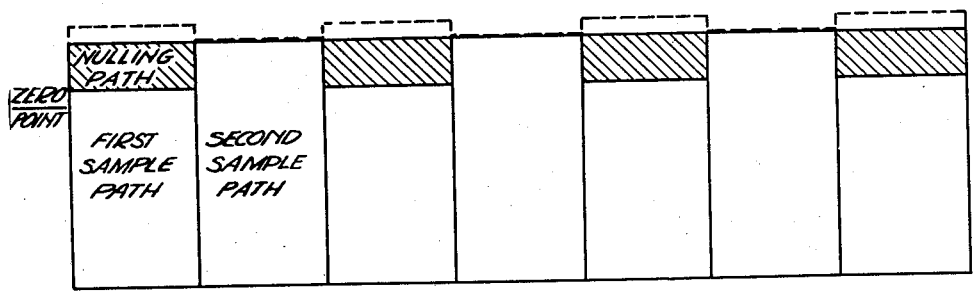

With such an initial operative point from which all measurements are taken, it may be seen that when the concentration of the absorptive radiation component in the first sample path 11 is greater than that in the second sample path 12, the detector will produce a signal as illustrated by the dotted waveform of Fig. 2b. Additional radiation energy must therefore be passed by the nulling path 10 in order to effect a null. If the concentration of the radiation absorptive component in the second sample path 12 is less than that of the first sample path 11, a signal of opposite phase will be produced as shown by the dotted line of Fig. 2c and the amount of radiation energy passed by the nulling path 10 is reduced beyond the arbitrarily established zero point so as to effect a null, as shown. This is made possible by the initial state of unbalance which is introduced into the system by reason of which a differential in the concentrations of the radiation absorptive component may be measured regardless of which sample path has the greater concentration of the component of interest.

Although such a "live zero" initial point of operation affords the advantages mentioned above in a radiation comparison system such as that contemplated by the present invention, the diminution of the radiation in one of the sample paths to effect the initial unbalance creates a condition by reason of which the same percentage change in concentration of the radiation absorptive component in both sample paths will cause different changes in the absolute amount of energy transmitted by the sample paths. This may perhaps be best seen by the illustrations of Figs. 3 and 4 which graphically indicate the number of units of energy change in each of two sample paths for a range of percentage change of the radiation absorptive component of interest. Fig. 3 shows the characteristics of a system in which an initial state of unbalance has been established between the two paths comparable to that represented by the radiation waveforms of Figs. 2a, b and c. The first sample path passes a maximum of 750 units of radiant energy while the second sample path passes 1000 units of radiant energy. The differential between the two, i.e., 250 radiation units, is supplied by the nulling path and thus the point at which the attenuator in the nulling path allows 250 units of radiation energy to pass is the "live zero" reading referred to hereinbefore.

It will be noted that the slope of the absorption concentration characteristics of the two sample paths are different. That is to say that a consistent change in percentage concentration of the radiation absorptive component of interest does not cause a change by the same amount of radiation energy units in both paths. This may perhaps be better understood if it is assumed that there is, for instance, a 10% change in concentration in each of the two sample paths. As shown in Fig. 4, a 10% change in the concentration of the absorptive component in the first sample path may result in a change in radiant energy of 15 units; a 10% change in the concentration of the radiation absorptive component of interest in the second sample path will, however, cause a change of 20 units in the amount of radiant energy passed.

Thus, it is necessary not only to effect a "live zero" by establishing an initial state of unbalance to operate the present system in accordance with the teaching of the invention, but the slopes of the absorption vs. concentration characteristics must be equalized so that the same percentage change in concentration will effect the same number of absolute energy units change in each of the sample paths. This may be effected by increasing the pressure of a gas sample, for instance, in the sample chamber transmitting the lesser radiation of the two, which happens to be the first sample path in this instance. Alternatively, the sample path which transmits the lesser radiation may be lengthened so as to equalize the absorption-concentration characteristics of the two sample paths in the manner previously described. The slopes of the absorption-concentration characteristics are thus made the same.

If the fluid samples are gas mixtures, either one of the two methods of increasing pressure or lengthening one of the sample paths may be employed, whereas if the sample mixtures are liquid the method of lengthening one of the sample paths affords the means of adjusting the operation of the system in accordance with the teaching of the present invention. The system thus adjusted and adapted will produce consistent radiant energy changes in each of the sample paths and yield a reliable and precise indication of the difference in concentration between the radiation absorptive components of the two samples. As shown in Figs. 3 and 4, the characteristics of the apparatus are preferably linear. They may vary somewhat from precise linearity, however, and yet operate in accordance with the teaching of the present invention.

The over-all operation of the apparatus may be better understood by reference to an example including several typical points of operation as tabulated below in units of radiant energy passing through each of the three radiation paths and corresponding scale readings.

| Sample path #2 | 1,000 | 1,000 | 850 | 900 | 800 |
|---|---|---|---|---|---|
| Sample path #1 | 750 | 600 | 750 | 550 | 650 |
| Nulling path | 250 | 400 | 100 | 350 | 150 |
| Scale reading | 0 | +150 | −150 | +100 | −100 |

In the above table the first column shows the energy balance of the apparatus without absorptive sample in either of the sample paths. Through the nulling path supplies the difference in radiant energy between the sample paths to achieve a null (250 units of energy under these conditions), the scale reading of the instrument is zero. This is in accordance with the concept of the "live zero" as explained hereinbefore.

When absorptive component is introduced in sample path #1 as shown in the second column, the scale indicates a commensurate reading having an arbitrarily designated positive sign to indicate that sample path #1 absorbs 150 more units of radiant energy than does sample path #2 due to the presence of absorptive component in sample path #1. The nulling path, it will be noted, supplies 400 units of radiant energy, or 150 units more than the 250 units it supplied under the initial conditions shown in the first column.

The third column illustrates the converse condition where sample path #2 has absorptive component in it and sample path #1 has not. The minus sign of the scale reading therefore indicates that sample path #2 contains more radiation absorptive component than does sample path #1. In this particular example, sample path #1 contains no absorptive component and it passes the full amount of energy which it did under the initial conditions as shown in the first column.

The fourth column is exemplary of a condition where both sample paths contain absorptive component, sample path #1 having a greater concentration than sample path #2. Sample path #1 therefore passes less radiant energy than sample path #2 as reckoned from their respective initial states. Accordingly, the scale reading indicates a differential of 100 energy units between the samples, and the positive sign signifies that the concentration of the radiation absorptive component is greater in sample path #1 than in sample path #2.

The fifth column of the table is illustrative of a condition where both sample paths contain an amount of absorptive component, but the concentration is greater in sample path #2 than in sample path #1 by a margin of 100 units of radiant energy.

The present invention finds many useful applications, one of which is the instance where it is desired to monitor the concentration of a particular component of a fluid mixture before and after a chemical reaction, or change of state, for instance. Another application of the present invention wherein its features may be advantageously employed is the type of problem presented in measuring radiation absorptive component in each of two samples which, if brought together, might cause a damaging or violent chemical reaction.

For example, when it is desired to compare the concentration of a particular component in each of two fluid mixtures it is possible in some problems to use a conventional apparatus and alternately introduce the sample fluid mixtures into the same sample path. If, however, the two sample mixtures produce a violent or harmful chemical reaction when they come together, such as forming solids, causing corrosion, or presenting the danger of explosion, the method of alternately introducing the two sample mixtures into the some sample path is not a desirable one because of the ever present danger of the samples being intermixed, at least in part.

By means of the present invention, however, two such samples may be investigated by introducing one of the samples into each of the two completely separate sample paths and thus comparing in the same instrument any radiation absorptive component which it is desired to investigate without the danger or necessity of the two samples ever being intermixed. The present invention as compared to the technique of alternate sampling, affords a means of obviating the need for purging the sample chamber as is quite often necessary when a single sample path is used.

It should be understood that in the practice of the present invention, the radiation absorptive component which it is desired to investigate need not be constituted of precisely the same fluid or mixture in each of the two samples, but may be any combination of components which absorb in comparable radiation spectral bands.

Additionally, it should be appreciated that the sample paths of the present invention may be rendered selectively sensitive in accordance with known techniques in the art, such as disclosed by E. H. Woodhull, E. H. Siegler and H. Sobcov at page 1396, volume 46 of the July, 1954 issue of Industrial and Chemical Engineering. Well-known filtering techniques may also be employed in apparatus embodying the present invention in order to eliminate absorptive spectral bands of the samples which are not common to both.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

We claim:

1. A system for measuring the relative content of a particular radiation absorptive component in each of two different samples, comprising a source of radiation, a detector receiving radiation from the source and responding thereto, means defining first, second and third radiation paths between said source and said detector, means for introducing one sample into each of said first and second paths, means for diminishing the amount of energy passed by said first path, means for equalizing the slopes of the absorption-concentration characteristics of said first and second paths, and variable attenuation means operatively connected to said detector output for maintaining the radiation passed by said third path equal to the difference between the radiation passed by said first and second paths, whereby the amount of said variable attenuation is a measure of the difference between the respective radiation absorptive content of said samples.

2. A system for measuring the relative content of a particular radiation absorptive component in each of two different samples, comprising a source of radiation, a detector receiving radiation from the source and responding thereto, means defining first, second and third radiation paths between said source and said detector, means for introducing one sample into each of said first and second paths, means for periodically blocking said paths, said first and third paths being blocked simultaneously and out of phase with said second path, means for diminishing the amount of energy passed by said first path, means for equalizing the slopes of the absorption-concentration characteristics of said first and second paths, and variable attenuation means operatively connected to said detector output for maintaining the radiation passed by said third path equal to the difference between the radiation passed by said first and second paths, whereby the amount of said variable attenuation is a measure of the difference between the respective radiation absorptive content of said samples.

3. A system for measuring the relative content of a particular radiation absorptive component in each of two different gas mixtures, comprising a source of radiation, a detector receiving radiation from the source and responding thereto, means defining first, second and third radiation paths between said source and said detector, means for periodically blocking said paths, said first and third paths being blocked simultaneously and out of phase with said second path, means for diminishing the amount of energy passed by said first path, means of introducing one sample gas into each of said first and second paths at respective pressures such that the product of pressure and radiation absorption coefficient is the same in both said paths, and variable attenuation means operatively connected to said detector output for maintaining the radiation passed by said third path equal to the difference between that passed by said first and second paths, whereby the amount of said variable attenuation is a measure of the difference in radiation absorptive component content between said gas mixtures.

4. A system for measuring the relative content of a particular radiation absorptive component in each of two different sample fluid mixtures, comprising a source of radiation, a detector receiving radiation from the source and responding thereto, means defining first, second and third radiation paths between said source and said detector, means for periodically blocking said paths, said first and third paths being blocked simultaneously and out of phase with said second path, means for diminishing the amount of energy passed by said first path, means for introducing a sample fluid mixture into a sample chamber in each of said first and second paths, the sample chamber in said first path being longer than that of the second path so as to equalize the slopes of the absorption-concentration characteristics of said paths, and variable attenuation means operatively connected to said detector output for maintaining the radiation passed by said third path equal to the difference between the radiation passed by said first and second paths, whereby the amount of said variable attenuation is a measure of the difference between the respective radiation absorptive content of said sample fluid mixtures.

5. A system for measuring the relative content of a particular radiation absorptive component in each of two different sample gas mixtures, comprising a source of radiation, a detector receiving radiation from the source and responding thereto, means defining first, second and third radiation paths between said source and said detector, means for diminishing the amount of radiation passed by said first path, means for periodically blocking said paths, said first and third paths being blocked simultaneously and out of phase with said second path, means for introducing a gas mixture sample into a sample chamber in each of said first and second paths, means for increasing the pressure of the sample in said first path to equalize the respective product of the pressure and radiation absorption coefficient in said first and second paths, and variable attenuation means operatively connected to said detector output for maintaining the radiation passed by said third beam equal to the difference between the radiation passed by said first and second paths, whereby the amount of said variable attenuation is a measure of the difference between the respective radiation absorptive content of said sample gas mixtures.

6. A system for measuring the relative content of a particular radiation absorptive component in each of two different sample gas mixtures, comprising a source of radiation, a detector receiving radiation from the source and responding thereto, means defining first, second and third radiation paths between said source and said detector, means for diminishing the amount of radiation passed by said first path, means for periodically blocking said paths, said first and third paths being blocked simultaneously and out of phase with said second path, means for introducing a gas mixture sample into a sample chamber in each of said first and second paths, means for decreasing the pressure in said second path to equalize the respective products of the pressure and radiation absorption coefficient in said first and second paths, and variable attenuation means operatively connected to said detector output for maintaining the radiation passed by said third beam equal to the difference between the radiation passed by said first and second paths, whereby the amount of said variable attenuation is a measure of the difference between the respective radiation absorptive content of said sample gas mixtures.

7. The method of measuring the relative concentration of a radiation absorptive component common to two different samples which comprises the steps of passing a beam of radiation through each sample, attenuating at least one of said beams to render them unequal in intensity, causing said beams to alternately impinge upon a common detector, equalizing the unit absorption vs. percent concentration characteristics of the two beams, supplying additional radiant energy through ancillary means and in phase with the less intense of the two radiation beams to cancel out the detected difference in intensity between the two beams, and measuring the amount of additional radiant energy necessary to maintain the null.

8. The method of measuring the relative concentrations of a radiation absorptive material which comprises providing two samples of differing radiation absorptive capabilities, each of said samples containing a finite amount of said radiation absorptive material; passing a beam of radiation through each of said samples; causing said beams to alternately impinge upon a common radiation-sensitive detector; attenuating at least one of said beams to render them unequal in intensity; varying the pressure of at least one of said samples to substantially equalize the unit absorption vs. percent concentration characteristics of said samples; supplying additional radiant energy to said detector through ancillary means, said additional energy being in phase with the less intense of the two radiation beams and equal to the difference in intensity between said beams; and measuring the amount of radiation energy passed through said ancillary means.

References Cited in the file of this patent
UNITED STATES PATENTS

| | | |
|---|---|---|
| 2,688,089 | Williams | Aug. 31, 1954 |
| 2,688,090 | Woodhull et al. | Aug. 31, 1954 |
| 2,754,424 | Woodhull et al. | July 10, 1956 |